(12) United States Patent
Ruehle

(10) Patent No.: US 9,665,664 B2
(45) Date of Patent: May 30, 2017

(54) DFA-NFA HYBRID

(71) Applicant: Intel Corporation, Santa Clara, CA (US)

(72) Inventor: Michael Ruehle, Albuquerque, NM (US)

(73) Assignee: Intel Corporation, Santa Clara, CA (US)

(*) Notice: Subject to any disclaimer, the term of this patent is extended or adjusted under 35 U.S.C. 154(b) by 177 days.

(21) Appl. No.: 13/684,922

(22) Filed: Nov. 26, 2012

(65) Prior Publication Data

US 2014/0149439 A1 May 29, 2014

(51) Int. Cl.
*G06F 17/30* (2006.01)

(52) U.S. Cl.
CPC ............................ *G06F 17/30985* (2013.01)

(58) Field of Classification Search
CPC ............ G06F 17/30985; G06F 17/30; G06F 2207/025; G06F 7/02; G06F 21/564; G06F 12/0292; G06F 12/06; G06F 12/1018; G06F 13/1605; G06F 13/1684; G06F 17/30442; G06F 17/30516; G06F 17/30587; G06F 17/03
USPC .......... 707/758, E17.014, E17.039, E17.009, 707/769, 737, E17.046, E17.005, 707/E17.041, E17.059, 754, 780, 707/E17.012, E17.017, E17.045, E17.061, 707/E17.108, 708, 713, 719, 755, 776, 707/791, 797, 800, 802; 706/48, 46, 12, 706/45, 59, 27, 47, 54, 55; 711/E12.001, 711/E12.057, 137, E12.021, E12.038, 711/E12.044, E12.058, E12.068, 105, 711/108, 118, 127, 130, 138, 149, 206, 711/216; 709/224, 223, 200, 231, 240
See application file for complete search history.

(56) References Cited

U.S. PATENT DOCUMENTS 5,485,620 A 1/1996 Sadre
5,870,576 A 2/1999 Faraboschi
(Continued)

OTHER PUBLICATIONS

Wei Zhang et al. ("A multiple Simple Regular Expression Matching Architecture and Coprocessor for Deep Packet Inspection", Published in 'Computer Systems Architecture Conference, 2008. ACSAC 2008. 13th Asia-Pacific'; date of Conference Aug. 4-6, 2008; p. 1-8).*

(Continued)

*Primary Examiner* — Jay Morrison
*Assistant Examiner* — Ken Hoang
(74) *Attorney, Agent, or Firm* — Barnes & Thornburg LLP

(57) ABSTRACT

Disclosed is a hybrid architecture combining DFA and NFA based engines. The DFA engine and NFA engine scan the same input stream. The DFA engine may be a multi-threaded engine. Fragments of rules are assigned to the DFA engine and portions of rules are assigned to the NFA engine. Fragments matched by the DFA engine may be sorted by a sorter into NFA launch positions before activating NFA states. A dynamically reconfigurable NFA cell array may be used. An NFA state signaled by a DFA fragment match is loaded into NFA cell(s). The DFA fragments may be adjacent to start state positions or following high-branching NFA states. Look-around assertions may be used by the DFA to signal to the NFA to either prevent or permit continued matching of a rule.

20 Claims, 1 Drawing Sheet

(56) References Cited

U.S. PATENT DOCUMENTS

| | | | |
|---|---|---|---|
| 5,937,181 A | 8/1999 | Godefroid | |
| 6,122,757 A | 9/2000 | Kelley | |
| 6,697,276 B1 | 2/2004 | Pereira | |
| 6,700,809 B1 | 3/2004 | Ng | |
| 6,934,796 B1 | 8/2005 | Pereira | |
| 7,119,577 B2 | 10/2006 | Sharangpani | |
| 7,260,558 B1* | 8/2007 | Cheng | G06F 17/30985 706/12 |
| 7,382,637 B1 | 6/2008 | Rathnavelu | |
| 7,539,032 B2* | 5/2009 | Ichiriu et al. | 365/49.17 |
| 7,710,988 B1* | 5/2010 | Tripathi et al. | 370/411 |
| 7,805,392 B1 | 9/2010 | Steele | |
| 7,899,904 B2 | 3/2011 | Ruehle | |
| 7,945,528 B2 | 5/2011 | Cytron | |
| 8,024,802 B1* | 9/2011 | Preston | 726/22 |
| 8,051,085 B1 | 11/2011 | Srinivasan | |
| 8,347,384 B1 | 1/2013 | Preston | |
| 8,448,249 B1 | 5/2013 | Preston | |
| 8,516,456 B1* | 8/2013 | Starovoitov et al. | 717/141 |
| 8,572,106 B1 | 10/2013 | Estan | |
| 8,862,603 B1 | 10/2014 | Watson | |
| 8,964,548 B1 | 2/2015 | Keralapura | |
| 2001/0014936 A1 | 8/2001 | Jinzaki | |
| 2002/0124162 A1 | 9/2002 | Yung | |
| 2003/0051043 A1 | 3/2003 | Wyschogrod | |
| 2003/0065800 A1 | 4/2003 | Wyschogrod | |
| 2004/0162826 A1 | 8/2004 | Wyschogrod | |
| 2004/0215593 A1 | 10/2004 | Sharangpani | |
| 2005/0012521 A1 | 1/2005 | Sharangpani | |
| 2005/0198625 A1 | 9/2005 | Shi | |
| 2005/0273450 A1 | 12/2005 | McMillen | |
| 2006/0101195 A1 | 5/2006 | Jain | |
| 2006/0136570 A1 | 6/2006 | Pandya | |
| 2006/0277534 A1 | 12/2006 | Kasuya | |
| 2007/0130140 A1 | 6/2007 | Cytron | |
| 2007/0182540 A1 | 8/2007 | Marman | |
| 2008/0034427 A1* | 2/2008 | Cadambi et al. | 726/22 |
| 2008/0046423 A1 | 2/2008 | Khan Alicherry | |
| 2008/0059464 A1 | 3/2008 | Law | |
| 2008/0071780 A1 | 3/2008 | Ichiriu | |
| 2008/0109431 A1 | 5/2008 | Kori | |
| 2008/0140600 A1 | 6/2008 | Pandya | |
| 2008/0270342 A1* | 10/2008 | Ruehle | 707/1 |
| 2008/0271141 A1 | 10/2008 | Goldman | |
| 2009/0063825 A1 | 3/2009 | McMillen | |
| 2009/0119399 A1 | 5/2009 | Hussain | |
| 2009/0177669 A1 | 7/2009 | Ramarao | |
| 2009/0327252 A1 | 12/2009 | Zhang | |
| 2010/0095367 A1 | 4/2010 | Narayanaswamy | |
| 2010/0191958 A1 | 7/2010 | Chen | |
| 2010/0192225 A1 | 7/2010 | Ma | |
| 2010/0198850 A1 | 8/2010 | Cytron | |
| 2010/0229238 A1 | 9/2010 | Ma | |
| 2010/0232447 A1 | 9/2010 | Jing | |
| 2011/0022617 A1* | 1/2011 | Yamagaki | 707/758 |
| 2011/0093496 A1 | 4/2011 | Bando | |
| 2011/0145181 A1 | 6/2011 | Pandya | |
| 2011/0196971 A1 | 8/2011 | Reguraman | |
| 2011/0219208 A1 | 9/2011 | Asaad | |
| 2011/0258210 A1* | 10/2011 | Agarwal et al. | 707/758 |
| 2011/0307433 A1 | 12/2011 | Dlugosch | |
| 2012/0011094 A1 | 1/2012 | Yamagaki | |
| 2012/0221497 A1* | 8/2012 | Goyal | H04L 63/1416 706/12 |
| 2012/0330868 A1 | 12/2012 | Tago | |
| 2012/0331554 A1 | 12/2012 | Goyal | |
| 2013/0046954 A1 | 2/2013 | Ruehle | |
| 2013/0073503 A1 | 3/2013 | Nagao | |
| 2013/0111503 A1 | 5/2013 | Tago | |
| 2014/0040261 A1 | 2/2014 | Horne | |
| 2014/0101185 A1 | 4/2014 | Ruehle | |
| 2014/0114996 A1 | 4/2014 | Ruehle | |
| 2014/0115263 A1 | 4/2014 | Ruehle | |
| 2014/0143195 A1 | 5/2014 | Ruehle | |
| 2014/0173603 A1 | 6/2014 | Ruehle | |
| 2014/0208076 A1 | 7/2014 | Ruehle | |
| 2014/0229926 A1 | 8/2014 | Xu | |

OTHER PUBLICATIONS

Morita, et al. (Apr. 1994). Parallel generation and parsing of array languages using reversible cellular automata. International Journal of Pattern Recognition and Artificial Intelligence, 8(02), 543-561.

Suejb Memeti, "Automatic Java Code Generator for Regular Expression and Finite Automata", published by Linneaeus Univeristy, Vaxjo, SE, for Degree Project, May 2012, pp. 1-47.

Michela Becchi, Charlie Wiseman, Patrick Crowley, "Evaluating Regular Expression Matching Engines on Network and General Purpose Processors", 5th ACM/IEEE Symposium on Architectures for Networking and Communications Systems (ANCS'09), Oct. 2009, pp. 30-39.

Michela Becchi, Mark Franklin, and Patrick Crowley, "A Workload for Evaluating Deep Packet Inspection Architectures", Workload Characterization, 2008. IISWC 2008. IEEE International Symposium on, Oct. 2008, pp. 79-89.

Michela Becchi, Patrick Crowley, "A Hybrid Finite Automaton for Practical Deep Packet Inspection", CoNEXT '07 Proceedings of the 2007 ACM CoNEXT conference, Dec. 2007, pp. 1-12.

* cited by examiner

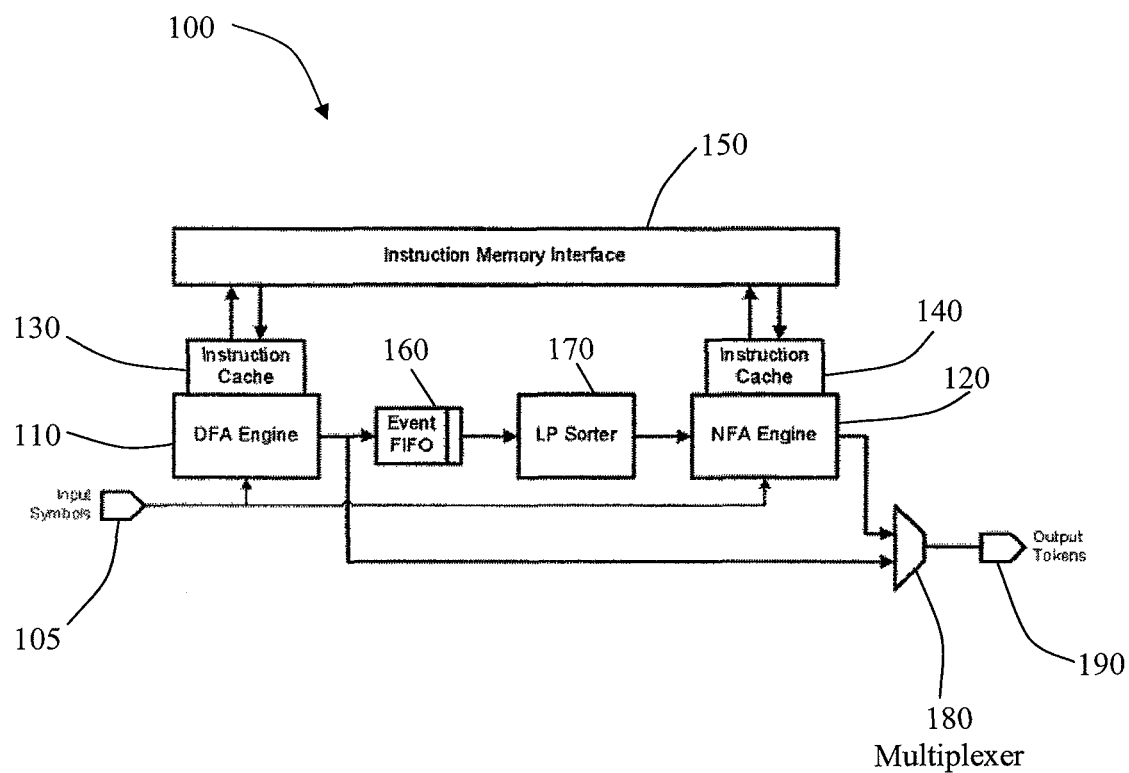

DFA-NFA HYBRID

BACKGROUND OF THE INVENTION

With the maturation of computer and networking technology, the volume and types of data transmitted on the various networks have grown considerably. For example, symbols in various formats may be used to represent data. These symbols may be in textual forms, such as ASCII, EBCDIC, 8-bit character sets or Unicode multi-byte characters, for example. Data may also be stored and transmitted in specialized binary formats representing executable code, sound, images, and video, for example. Along with the growth in the volume and types of data used in network communications, a need to process, understand, and transform the data has also increased. For example, the World Wide Web and the Internet comprise thousands of gateways, routers, switches, bridges and hubs that interconnect millions of computers. Information is exchanged using numerous high level protocols like SMTP, MIME, HTTP and FTP on top of low level protocols. Further, instructions in other languages may be included with these standards, such as Java and Visual Basic. As information is transported across a network, there are numerous instances when information may be interpreted to make routing decisions. In an attempt to reduce the complexity associated with routing decisions, it is common for protocols to be organized in a matter resulting in protocol specific headers and unrestricted payloads. Subdivision of the packet information into packets and providing each packet with a header is also common at the lowest level, for example TCP/IP. This enables the routing information to be at a fixed location thus making it easy for routing hardware to find and interpret the information.

SUMMARY OF THE INVENTION

An embodiment of the invention may therefore comprise a system for matching input symbols from an input stream, said system comprising a DFA engine enabled to receive input symbols from the input stream to match predetermined rule fragments suitable for processing by the DFA engine and to signal entrance events, said entrance events comprising launch positions, based on the matches of the predetermined rule fragments, and token outputs, and an NFA engine enabled to receive the entrance events, activate corresponding NFA states at the launch positions, match corresponding tail portions, and signal output tokens.

An embodiment of the invention may further comprise a method of matching a rule to symbols from an input stream, said method comprising matching symbols from the input stream to at least one fragment of the rule in a DFA engine, matching symbols from the input stream to a corresponding other portion of the rule in an NFA engine, and outputting a match token.

An embodiment of the invention may further comprise a method of matching, within a hybrid engine, symbols in an input stream to a rule, said hybrid engine comprising a DFA engine and an NFA engine, said method comprising compiling the rule with a hybrid compiler into a set of instructions for use within the hybrid engine wherein the compiler apportions into at least one fragment, said at least one fragment being suited to processing in a DFA engine, assigning at least one of the fragments suited to DFA processing to the DFA engine, assigning at least a portion of the rule to the NFA engine, matching any fragments assigned to the DFA engine to symbols from the input stream, signaling events to the NFA engine, sorting the events by launch positions, activating corresponding NFA states at indicated launch position, matching at least one portion of the rule in the NFA engine with symbols from the input stream in the NFA engine, and outputting tokens based on successful matches.

BRIEF DESCRIPTION OF THE DRAWINGS

FIG. 1 is a block diagram of an embodiment of the invention.

DETAILED DESCRIPTION OF THE EMBODIMENTS

With the increasing nature of the transmission of information, there is an increasing need to be able to identify the contents and nature of the information as it travels across servers and networks. Once information arrives at a server, having gone through all of the routing, processing and filtering along the way, it is typically further processed. This further processing necessarily needs to be high speed in nature.

The first processing step that is typically required by protocols, filtering operations, and document type handlers is to organize sequences of symbols into meaningful, application specific classifications. Different applications use different terminology to describe this process. Text oriented applications typically call this type of processing lexical analysis. Other applications that handle non-text or mixed data types call the process pattern matching.

Performing lexical analysis or pattern matching is generally a computationally expensive step. This is because every symbol of information needs to be examined and dispositioned.

Regular expressions are well known in the prior art and are used for pattern matching and lexical analysis. Regular expressions provides a concise and flexible means for "matching" strings of text, such as particular characters, words, or patterns of characters. Abbreviations for "regular expression" include "regex" and "regexp" and these abbreviations may be used throughout this specification interchangeably with each other and with the term "regular expression". A regular expression is written in a formal language that can be interpreted by a regular expression processor, which can be a program that examines text or other characters in and identifies parts that match the provided rules of the regular expression. A regular expression in its simplest expression is a pattern. It is an expression that specifies a set of strings Examples of specifications that could be expressed in a regular expression are as follows:
   the sequence of characters "car" appearing consecutively in any context, such as in "car", "cartoon", or "bicarbonate"
   the sequence of characters "car" occurring in that order with other characters between them, such as in "Icelander" or "chandler"
   the word "car" when it appears as an isolated word
   the word "car when preceded by the word "blue" or "red"
   the word "car" when not preceded by the word "motor"
   a dollar sign immediately followed by one or more digits, and then optionally a period and exactly two more digits (for example, "$100" or "$245.98").
These sequences are simple and are intended only for purposes of example. Specifications of great complexity are conveyable by regular expressions.

Regular expressions are used by many text editors, utilities, and programming languages to search and manipulate text based on patterns. Some of these languages, including Perl, Ruby, AWK, and Tcl and may integrate regular expressions into the syntax of the core language itself. Other programming languages like .NET languages, Java, and Python provide regular expressions through standard libraries.

To find matches to regular expressions or similar pattern matching rules within a symbol stream, two main types of state machines may be constructed. These are nondeterministic and deterministic finite automata (NFAs and DFAs). Abstractly, an NFA or DFA is a directed graph of NFA states in which each graph vertex is a state. Each graph edge is labeled with a class of input symbols that it accepts, representing a transition from a source state to a destination state on that symbol class. The defining difference between NFAs and DFAs is that any two out-transitions from a DFA state must have non-intersecting symbol classes, but a single NFA state may have multiple out-transitions labeled with classes containing the same symbol. This simple difference leads to very different algorithms which are appropriate to execute NFAs and DFAs to scan input streams and find rule matches, different performance and resource characteristics and different advantages and disadvantages for various rule types. This is true whether executed in software or in hardware engines.

In a DFA, a scan beginning with a given input symbol can be executed by a single-pass descent from the DFA root state in which a single state is active at each successive symbol position. This occurs until the descent or stream terminates. Within this single scan, the information to track scan can be an incrementing symbol position and current state ID. This may result in deterministically fast scan performance. Also, many rules can be matched simultaneously by such a single descent in a single DFA with potentially the same deterministically fast performance. Also in a DFA, state explosion may occur if the rules have complexities that interact in certain ways, as is understood in the art. A very large DFA may match those rules. The number of DFA states required may grow exponentially with the size of the ruleset compiled. Standard constructions produce DFAs that can only find rule matches which begin at a single symbol position where the DFA descent begins. In order to find matches beginning at any symbol position, multiple DFA descents are required, commonly one descent from each symbol position. When many DFA descents of varying length are required to find all matches in a symbol stream, the net performance is effected and not deterministic. A type of DFA may be constructed with the "Aho-Corasick" algorithm which can find matches beginning at any symbol position using a single descent from the first symbol position, but Aho-Corasick DFAs may result in state explosion, so they are not practical in many applications, and may have lower performance due to poorer cache performance than non-Aho-Corasick DFAs.

NFAs are executed differently than DFAs. NFA execution may begin in a single root state and its non-determinism means that states may repeatedly be reached where the current input symbol stimulates two or more different next-state transitions. These are commonly referred to herein as destination states or child states. When this occurs, it is inherently undefined which transition(s) may eventually lead to a match. Potentially, all options need to be tried. Two methods are commonly used to handle non-determinism in automatons. On method is to utilize recursive execution. When multiple transitions are possible, an arbitrarily chosen transition is taken. If matching fails somewhere down the arbitrary path, the NFA execution "backs up" to the point of the choice and selects another arbitrary path, assuming there are still more than one path remaining to be chosen. In this method, execution proceeds recursively along the various paths through the NFA graph until an accepting state is reached, or until no alternative path remains to be chosen.

Another method of NFA execution for multiple paths is known as a Thompson NFA. When an active state has multiple out-transitions matching the next symbol in the input stream, all of these transitions are taken at the same time. Multiple destination states are activated upon consumption of the symbol. After each input symbol is consumed, any number of NFA states may be active, from zero states to all the NFA states. Thompson NFA execution is a process of tracking the active state subset as it evolves with each symbol consumed. Any time the active state subset includes one or more accepting states, corresponding rules have been matched. Execution may begin with a single root state active. One may construct NFAs with multiple start states that will begin active in Thompson execution.

A Thompson NFA allows for a single pass over the input symbols sufficient to find all matches, including long matches. This is unlike non-Aho-Corasick DFA execution. In this manner, NFA performance can be deterministic. Also, in NFAs, the size of an NFA is roughly proportional to the size of the ruleset it is constructed from. NFAs do not have state explosion like DFAs and the NFA instruction footprint for a moderately large ruleset is generally of manageable size. Accordingly, depending on the application, NFA instructions may be stored locally inside a scanning engine or accessed through a cache that can behave well and yield low average access latency. In an NFA, a variable and potentially large number of NFA states may be active at a single position in the input stream and the Thompson NFA scanner must manage and execute this varying set of active states. In a software scanner, more processor steps are required to execute a larger set of active states. Performance varies with the active set size.

Parallel hardware NFA engines typically use a Thompson NFA implementation. In such engines, multiple NFA cells exist as physical logic within a cell array where each cell is configured to track one or more NFA states derived from the rules. Also, large NFA states may occupy more than one cell in the array. The states tracked by a cell may be active or inactive. Cells are able to signal to other cells and activate them. Such signals represent state transitions. The cell array is initialized with start states active and input symbols or information corresponding to those symbols are broadcast to the cells. Logic associated with each transition is configured to detect the proper symbol class and examines each input symbol to determine if it belongs to the transition class. Whenever a state is active and the next symbol matches a transition class, a signal is sent to the destination cell.

The cell array may be statically configured with an entire NFA before scanning an input stream, such that every NFA state is represented by some cell. Alternatively, according to the methods of U.S. Pat. No. 7,899,904 to Ruehle, incorporated herein by reference in its entirety, cells may be dynamically reconfigured on demand during a scan so that the cell array does not need to be large enough for the entire NFA. It needs to only be large enough for active state subsets achieved during a scan. It is understood that any particular dynamically configurable NFA cell array may at some time be insufficient to accommodate at a single time an entire active sub-set of an NFA. However, it is also understood that stalls and state misses may be minimized by anticipating such issues during compilation of the ruleset. It may be possible for a single cell to represent more complex subgraphs of multiple NFA states. When a cell is dynamically configured, signal connections are also configured between the cell and its destination and source states in the cell array.

Typically, DFAs are more adept at handling large sets of rules. This is especially so when the individual rules are fairly simple and cannot match very long symbol strings. NFAs are typically more adept at handling small sets of rules where the rules may be complex and may match long symbol strings. Neither NFAs nor DFAs are catch-all for large sets of complex, long-matching rules. While both are capable of handling such, both also have strengths as noted.

A NFA or a DFA may support "look-around assertions". "Look-around assertions" are sub-expressions appearing somewhere in a rule which do not consume any symbols but are defined to require that the symbols before or after the present position must match a certain pattern, or must not match a certain pattern ("negative look-around assertion") for overall rule matching to proceed or to develop context for a rule match. There are positive look-ahead, negative look-ahead, positive look-behind and negative look-behind assertions available. A match in the DFA of a look-around assertion will require the NFA engine to react to the match. Either the NFA will proceed with matching or further matching will be prohibited, depending on the results of the look-around assertion match.

"Look-around" assertions are zero width patterns which match a specific pattern without including it in the consumption of symbols from the input stream. Positive assertions match when their sub-pattern matches. Negative assertions match when their sub-pattern fails to match. Look-behind assertions match text up to the current match position. Look-ahead assertions match text following the current match position. Look-around assertions are discussed more fully below.

High branching states, in which one state in an automaton has transitions to many other states, can be resource challenging to existing DFA and NFA matching methods. In DFAs, high branching states may contribute to state explosion. In particular, they may contribute to large cache working set size and cache performance efficiencies. In NFAs, high-branching states may contribute to inefficient use in dynamically configurable cell arrays.

In an embodiment of the invention, a hybrid (HFA) engine or scanner comprises a DFA engine and an NFA engine which cooperate to find matches to a set of regular expression or similar rules within an input stream. Matching may occur at the beginning of a rule with a DFA and the rest of the rule with an NFA. A DFA may match an entire rule. An NFA may match an entire rule. A DFA may match a portion of a high-branching rule and configure appropriate child states which reference a parent state. A combination of a multi-threaded DFA engine with a dynamically configurable NFA cell array may be present. A DFA engine may signal into an NFA engine at the beginning of a scan to activate NFA start states. Timers may be set in NFA cells to activate states at target positions. Parent states may be loaded into an NFA cell array without reference to child states and loading a child state that refers to the parent state where the child state dynamically connects with the parent state. A look-around assertion fragment may be matched in a DFA engine where a state is signaled in an NFA engine which continues or stops matching in response to the signal.

Both a DFA engine and an NFA engine will receive and examine an input stream and find matches to rules or rule fragments. Each engine may be implemented in software or in hardware. The DFA engine examines each symbol in the input stream before the NFA engine does so. Communication between the DFA engine and NFA engine flows primarily or exclusively from the DFA engine to the NFA engine. In many circumstances, the DFA engine may be unaware if it is matching a beginning to a rule or a portion of a rule following a high-branching state in the middle of a rule. When one or both engines is implemented in software, the DFA engine may scan an entire input stream (or an entire packet of the input stream) first, with its signals to the NFA engine recorded in a memory and fed into the NFA engine with the input stream at a later time.

The DFA engine and the NFA engine may both be implemented in hardware. They may be pipelined together to scan each input stream substantially at the same time. The DFA engine is upstream in the pipeline and the NFA engine downstream. Hardware engines are typically faster than software engines and a pipelined configuration allows a complete HFA scan to complete in a minimal amount of time. It may also require minimal storage of signals from the DFA engine to the NFA engine. However, it is understood that the invention may be implemented using software or hardware implementations. Depending on the embodiment, certain components may be embodied in one or more reconfigurable logic devices, such as a field programmable gate array (FPGA), an application specific integrated circuit (ASIC), a system-on-chip (SoC), or a multi-chip module. In some embodiments, components may be implemented on a personal computer or on a dedicated processing unit for monitoring web traffic. In one embodiment, an apparatus for detecting patterns in a data stream comprises a memory storing state information associated with one or more states of a state machine in respective memory locations of the memory.

With both a hardware DFA and NFA engine, the DFA engine will run ahead of the NFA engine. The DFA engine may establish a substantial lead, such as 100 symbol positions or more. The NFA engine may be a cell array which executes an NFA by the Thompson algorithm. The NFA engine may be dynamically configurable. An NFA cell array, whether statically or dynamically configurable, can scan the input stream rapidly in a single pass, processing one input symbol every clock cycle, for example. Accordingly, the DFA engine should also be able to process the input stream rapidly, keeping up with the speed of the NFA engine. A multi-threaded DFA architecture may be utilized to keep up with the NFA engine's speed requirements. Accordingly, a multi-threaded DFA engine may be used in conjunction with a dynamically configurable NFA cell array. While further discussion of the invention may assume such a combination, it is understood that other combinations and embodiments are applicable to the HFA of the invention. The DFA engine may be software or single-threaded, or the NFA engine may be software, or the NFA cell array may be statically configurable or another hardware NFA engine.

FIG. 1 is a block diagram of an embodiment of the invention. A hybrid architecture 100 comprises a DFA engine 110 which receives input symbols 105 from an input stream (not shown). Instructions for the DFA engine 110 are accessed via an instruction cache 130. The instruction cache 130 may be an L1 cache. The instruction cache 130 in turn receives/accesses instructions from an instruction memory (not shown) via an instruction memory interface 150. The architecture 100 also comprises an NFA engine 220. The NFA engine 120 is connected to an instruction cache 140 which also may be an L1 cache. The instruction cache 140 for the NFA engine 120 accesses instructions from the instruction memory (not shown) via the instruction memory interface 150. The NFA engine 120 receives input symbols 105 from the same input stream as the DFA engine 110. FIG. 1 shows an Event FIFO 160 and an LP Sorter 170 for processing signals from the DFA engine 110 to the NFA engine 120. A multiplexer 180 receives outputs from both the DFA engine 110 and the NFA engine 120 and may output an output token 190 upon a successful match of a rule.

A typical rule can be logically divided into a beginning, or entrance fragment, matched by the DFA engine 110 and a tail portion typically matched by the NFA engine 120. The DFA engine 110, after matching a fragment, will signal to the NFA engine 120 indicating an entrance NFA state which should be activated to continue matching the rule. The signal may include a launch position in the input symbol stream where that entrance state should be activated. Normally this position will be after the last symbol of the entrance fragment match by the DFA. When the NFA engine 120 reaches the indicated launch position, the entrance state is activated and continues matching the rule by detecting transition classes and activating next states in the NFA cell array. This will happen until an accepting state is reached and reports a full match of the rule, taking an action such as generating a token. The entrance fragment is assigned to the DFA engine 110 by a DFA/NFA compiler (not shown) such that it is a DFA friendly fragment. This may mean that it a relatively simple rule fragment, matching a relatively short maximum length, such as 8 or 64 symbols, but which is not extremely short, such as 1 or 2 symbols. The fragment may also be relatively narrow as to symbol classes (character classes not matching many symbols, such as [abcd]). The fragment may also be at or near the beginning of the rule.

For example, the regular expression "abc.*def.*ghi" can be used to illustrate a fragment methodology embodiment of the invention. In the expression, '.*' matches any number of symbols of any type. A DFA entrance fragment may then be "abc". The first '.*' will not be included in the DFA fragment because it can match any length and using just "a" or "ab" would be too short, leaving 'c' either by itself or combined with a potentially lengthy '.*'. Nothing is added by this. Accordingly, the DFA is configured by the compiler to match the fragment "abc". It is understood that additional rules may be configured into the DFA. The NFA is configured to match the remainder, or tail portion, of the rule, ".*def.*ghi". When the DFA matches 'abc' somewhere in the input stream, it will signal to the NFA to launch an entrance NFA state such as a state matching ".*d". This state will be activated in the NFA cell array at the input position after the 'c' in 'abc", so it is able to match 'd' at the next symbol position, or later (according to the '.*'" possible indeterminate matches). When it matches 'd', it transitions to a next state in the NFA cell array, for example matching 'e', and so forth, until a final state matches 'i' and generates a token.

The DFA instructions indicating successful matches in DFA accepting states can include a flag or code to indicate the proper action for each match. A DFA instruction may contain a token ID to output for a whole rule match, in situations where the DFA is suited to match an entire rule, such as for a simple rule like "abed". When an entrance fragment match is indicated, the same token ID field can contain a reference to the NFA state to be activated. This may be the address of the first instruction for the NFA state and a number of instructions in the NFA state.

Some rules, such as rules with complex beginnings, wide symbol classes or large quantifiers near the beginning of the rule, may be matched entirely by the NFA. In such cases, the compiler will not assign a beginning fragment to the DFA. These rules may be essentially rules where no appropriate DFA entrance fragment is present. For example, the rule "[a-z].*123" may be assigned entirely to the NFA because [a-z] is not an appropriate DFA entrance fragment. It matches easily, thus putting an undesirable burden of work on the DFA engine and generating an undesirable frequency of entrance state signals into the NFA. It is understood that the line between what is suitable, or desirable, for a DFA entrance fragment, or other type fragment discussed herein, may vary from implementation to implementation. The examples, as used here, are just to illustrate possibilities.

Matching a whole rule requires the NFA cell array to contain a corresponding start state matching [a-z]", which is active at the beginning of the scan and may remain active during the entire scan. An NFA start state could match [a-z]" at any position, and then transition to a next state matching ".*1". If the NFA engine 120 is a statically configurable cell array, start states may be configured directly into the array before scanning. If it is dynamically reconfigurable, then the DFA engine 110 may signal the NFA engine 120 at the beginning of each scan to activate the necessary start states. The NFA engine 120 may also be configured with a list of start states to activate at the beginning of each scan. Since signaling NFA state activations may be a function of the DFA engine 110, it may also function to activate start states.

By having the DFA engine 110 function to signal to activate start states, the NFA cell array begins each scan empty. By empty, it is meant that there are no active states. The NFA cell array waits for the DFA to signal NFA state activation. This puts the DFA engine 110 in full control of the scan. The NFA engine 120 will match only in response to the DFA engine's 110 signals. For example, the DFA engine 110 may be constructed to be configurable to match using multiple DFAs, corresponding to multiple groups of rules, where a scan command indicates which rule group should be used to scan a particular stream. The DFA engine 110 can then signal to activate NFA start states corresponding to the selected rule group by accessing start-of-scan instructions stored with the associated DFA and by executing that DFA. The DFA engine 110 will match entrances and signal NFA entrance state activations corresponding to the selected rule group. Resultantly, the NFA engine 120 will respond by activating states and finding matches corresponding to the selected rule group.

The DFA engine 110 may find numerous entrance matches rapidly and generate the next entrance state launch signal to the NFA engine 120 without waiting for the NFA engine 120 to process the previous signal. As noted, the DFA will be unaware of the state of the NFA since communication flows predominantly in one direction. The signals may be stored as entrance events in a buffer or queue which the NFA engine 120 will be enabled to access. Each entrance event will comprise a reference to the NFA state to be activated and a launch position in the symbol stream where it should be activated. This may be such as the position after the last symbol in the entrance fragment match. The entrance events may be sorted into order of increasing launch positions before the NFA engine 120 processes them. This way they can be processed in an order to activate their corresponding NFA states at increasing symbol positions. Such sorting may be accomplished by a Launch Position Sorter (LPS) 170 module situated between the DFA engine 110 and the NFA engine 120. Though the LPS is shown in FIG. 1, it is understood that the module may also be part of either the DFA engine 110 or the NFA engine 120. The DFA engine 110 writes events with launch positions into the LPS 170 and the NFA engine 120 will read events from the LPS 170. As noted, these may be accessed in increasing order of launch position.

Many sorter architectures are appropriate. For example, the LPS 170 can have a sliding window of launch position bins. Each bin would contain some number of events with the corresponding launch position, or each bit could contain a pointer into a linked list of events with the corresponding launch position. A sliding window of fixed size may be adequate, such as 128 symbol positions, assuming that DFA entrance fragments are restricted to some shorter length, such as 64 symbols. The left edge of the sliding window would be determined by the read position of the NFA engine 120 and the DFA engine 110 may not progress so far ahead that it overwrites the right edge of the sliding window. However, to permit the DFA engine 110 to scan further ahead that the LPS window length, the DFA engine 110 can write events into an event FIFO 160 of some predetermined capacity such as 256 events. These would transfer from a read side of the event FIFO 160 into the LPS 170 whenever they did not transgress the right edge of the sliding window. The DFA engine 110 may scan arbitrarily far ahead of the NFA engine 120 until the event FIFO 160 becomes full. The LPS 170 can be designed to automatically output an event of the next lowest launch position each time the NFA engine 120 accesses it, such as by transferring events from the first occupied bin within the sliding window or from the linked list accessed through than bin.

When the NFA engine 120 reads entrance events from the LPS 170, it will need to activate the referenced state at the indicated launch position. In the case of a dynamically reconfigurable NFA cell array, the NFA engine 120 will load the referenced state in at least one cell of the array. The needed state may not already be present, which may occur since the state is for a rule just beginning to match and may not have been used recently. If the state is already present in the NFA cell array then the NFA engine 120 will not need to load that state. To load a state into a cell(s), one or more instructions corresponding to the state will be accessed from an instruction memory or cache. If it is a cache, it is not unlikely that there may be a cache miss. This may occur because the rule may not have been matched recently. Due to the fact that the NFA lags the DFA by a number of symbols, there is time to resolve the cache miss by filling referenced instructions into the cache. Accordingly, when a cache 140 is used for NFA instructions, the NFA engine 120 will read events from the LPS 170 as soon as possible without waiting until the NFA engine 120 scan approaches the launch position. This is so that more time is allowed to resolve any cache misses. After the instructions for the state are retrieved from the memory or cache, they can be loaded into one or more cells in the cell array as required or indicated by those instructions. The cells can be configured earlier, in background, rather than waiting until the cell array reaches the launch position. The cells, however, should not be configured too earlier to avoid too many cells being occupied with inactive states waiting to activate. Accordingly, the NFA engine 120 may wait until a reasonable time before the launch position. This may be, for example, 16 symbols prior to the launch position to commence loading the state using its instructions. To support early instruction cache access but delayed state loading, the retrieved instructions may be held in a queue waiting for their time to load.

Once the target state is present in the NFA cell array (statically or dynamically configurable), it needs to be activated at the launch position indicated by the event. Each NFA cell may contain a launch timer which can be programmed in the background before the launch position is reached. The launch timer will wait until the launch position is reached and then autonomously activate the cell. In this manner, the entire action of the event can be applied to the cell(s) with the target state in advance in the background and no other actions need to be performed at the launch position. This may aid in minimizing stalls that would ensue for taking actions exactly at the lunch position.

The HFA architecture, in which a DFA engine 110 matches rule entrance fragments, and an NFA engine 120 activates corresponding entrance states and matches the remainders of the rules, leverages strength of both DFA 110 and NFA engines 120. It also compensates for any weakness that may be part of either type of engine. In the HFA, the DFA portion is only assigned simple entrances and simple whole rules to minimize state explosion. It is understood that the term simple is relative and a compiler can vary in its assignations of fragments to DFAs. Further, the DFA is assigned relatively short fragments and rules. Again, it is understood that the term short is relative and a compiler can vary in its assignations of fragments to the DFAs. The DFA will match the entrances of most rules, which correspond to the most frequent active NFA states if an NFA is used to match whole rules. In other words, the most frequent active NFA states are those that are at the beginning of rules. Accordingly, have the DFA match these portions will minimize the number of required active states in the NFA, thus leaving fewer active NFA states to track on average. The sub-expression level cooperation between DFAs and NFAs achieves good compensation between the weaknesses and strengths of DFAs and NFAs. The high scan speed of a multi-threaded DFA engine may be used to keep up with the NFA cell array speed.

In cases where no suitable DFA entrance fragment can be found in a rule, the default response is to assign the whole rule to the NFA, which requires the use of an NFA start state, which may be expensive because it is typically always active. Also, while some rules may not begin with DFA-friendly fragments, they may contain DFA-friendly fragments later in those rules. If there is a mid-rule DFA friendly fragment, which (a) must be matched in order to match the rule, and (b) will be reached a limited distance (such as under 20 symbols or 64 symbols) from the beginning of the rule match, then "DFA Filtering" can be used.

With such a mid-rule DFA friendly fragment, called a "filter fragment" for purposes of this description, matching will occur in the DFA. Accordingly, the DFA will not match the "prefix", the rule portion before the filter fragment. When the DFA matches a filter fragment, it sends a filter event into the NFA, with a launch position computed equal to the earliest position where the entire rule match (containing the filter fragment match) might possibly begin. Filter launch positions will always be to the left, prior to, the position of the filter fragment.

In situations where the prefix has a fixed length, the launch position is a quantity of symbols equal to the fixed prefix length before the first symbol of the filter fragment match. The filter event generated by the DFA will activate a non-permanent NFA start state at this launch position, which is the root of an NFA state graph configured to match the entire rule, not just the post-fragment tail.

A first example is: "[a-z][0-9][A-Z]alpha.*beta". "[a-z][0-9][A-Z]" is the prefix, with a fixed length of 3 symbols. "alpha" is the filter fragment. When the DFA matches "alpha", it sends a filter event into the NFA. The launch position is three (3) symbols left of the first symbol in "alpha", to activate a non-permanent start state matching "[a-z]", and proceeding to match the whole rule "[a-z][0-9][A-Z]alpha.*beta" in the NFA. If the input actually matches the rule, such as "x0Zalpha beta", this launch position of the [a-z] non-permanent start state corresponds to the beginning of the match.

Rather than matching the example rule solely with the NFA (since the NFA is matching the whole rule eventually), using DFA filtering fragments allows the start state matching [a-z] to be non-permanent. The NFA is activated only at positions where the rule is likely to begin matching. One advantage of this DFA filtering is that it is less expensive than having a permanent start state active in the NFA for the entire scan, which is required for pure-NFA matching.

In situations where the prefix has a variable (but necessarily bounded) length, the launch position is a quantity of symbols equal to the maximum prefix match length before the first symbol of the filter fragment match. This corresponds to the earliest start position of a full rule match containing the filter fragment match. The filter event generated by the DFA will activate a non-permanent NFA start state at this launch position, which is a "keep-alive spinner" leading to further NFA states that match the whole rule. The keep-alive spinner allows the rule to begin matching within a symbol window that begins at the launch position, and ends a number of symbols later equal to the difference between the minimum and maximum lengths of prefix matches.

A second example is: "[A-Z].{3,6}gamma.*delta". "[A-Z].{3,6}" is the prefix, which has a minimum match length of 4 symbols, a maximum of 7 symbols, and a difference of 3 symbols. "gamma" is the filter fragment. When the DFA matches "gamma", it sends a state launch event into the NFA, 7 symbols left of the first symbol in "gamma", to activate a non-permanent keep-alive spinner, which will allow further NFA states to begin matching the rule immediately, or within the next 3 symbols. The NFA states including the keep-alive spinner may be represented by the augmented regular expression: ".{0,3}[A-Z].{3,6}gamma.*delta", where the keep-alive spinner is ".{0,3}".

The purpose of the keep-alive spinner is to allow the NFA to match the whole rule at any position that a match might begin, which is not completely determined by the location of the "gamma" filter fragment match, because the "[A-Z].{3,6}" prefix can match from 4 to 7 symbols. Therefore the keep-alive spinner is launched at the earliest possible start position, corresponding to a 7-symbol prefix match, and the keep-alive allows the original rule to begin matching at this earliest possible position, or within the next 3 symbols, the last of which is the latest possible position corresponding to a 4-symbol minimum prefix match. Thus, inputs of "Abcdxxxgamma delta", "aBcdxxxgamma delta", "abCdxxxgamma delta", and "abcDxxxgamma delta" would all match by this method, with the keep-alive spinner being active from the A/a position to the D/d position.

If the NFA engine tracks a match start pointer, it can be initialized to the launch position of the event from the DFA. This will be accurate for fixed-length prefixes, but may by inaccurate for variable-length prefixes because it includes the length of the keep-alive spinner which was not in the original rule. The NFA instructions can command a new start pointer to be captured at the position where the original rule begins matching. In Perl Compatible Regular Expressions (PCRE) notation, "\K" indicates a position in a match where a new start pointer should be captured. In this notation, the NFA states for Example 2 should match ".{0,3}\K[A-Z].{3,6}gamma.*delta".

Returning again to FIG. 1, in connection with the DFA/NFA cooperation described above, an embodiment of an HFA architecture 100 of the present invention may support additional features. One such feature is look-around assertions. Various regular expression languages permit a first expression to be modified by inserting a second expression inside of it. This will have an operator indicating that the second expression is a zero width assertion. This means that it does not consume any input symbols with respect to matching the first expression. For the first expression to continue matching, the second expression must be tested against the symbols after the insertion point (for look-ahead) or before the insertion point (for look-behind). The assertion must match for a positive assertion or must not match for a negative assertion. Once syntax for look-around assertions is as follows:

(?=pattern) is a positive look-ahead
(?!pattern) is a negative look-ahead
(?<=pattern) is a positive look-behind
(?<!pattern) is a negative look-behind It is understood that varying syntax may be used in different rules' languages.

For example, the expression "(?<=cat)fish" will match a string 'fish' only inside the larger 'catfish'. Also, the expression "cat(?!=atonic).*dog" will match 'cat' followed eventually by 'dog' but only when the 'cat' is not inside the larger 'catatonic'. As noted, look-around assertions may look both forward and backward. They may also apply some test of nearby ("around" the area) symbols which is not a regular expression check in the strict sense. This may be such as testing a numerical string against a threshold value. Often, look-around assertions provide context for the rule to be matched.

To match a rule with look-around in the HFA architecture 100, the rule will first be compiled into a DFA entrance and NFA tail portion as described above. The look-around assertion portion will be ignored but the insertion point of the look-around will be in the NFA portion. The DFA engine 110 is additionally configured to search for the look-around fragment. When the DFA engine 110 matches the look-around fragment, it sends a look-around event signal to the NFA engine 120. Like an entrance event, the look-around event has a launch position, which is normally the position before the first symbol of the fragment match for a look-ahead assertion, or the position of the last symbol of the fragment match for a look-behind. The look-around event also carries an NFA state reference to an NFA state at the assertion's insertion point in the original expression. As with an entrance event, the look-around event passes through the LPS 170, accesses NFA instructions for the target state and loads the target state into the NFA cell array if not present. However, the target state is not activated by the look-around event. Rather, it receives the look-around event as a signal, at the event's specified launch position, delivered by a launch timer. This is similar to an entrance event. The look-around event targets a specific state transition connected to the target NFA state, which may be a transition into the state, a transition out of the state, or a transition between sub-states of a complex NFA state. The look-around event or the state configuration can indicate which transition is targeted. If the target state transition is not attempting to signal at the time that the state receives the look-around event, nothing will happen. The look-around fragment match will have no effect because it does not coincide properly with matching of the main expression. If the target state transition is attempting to signal at the time that the state receives the event, it does one of two things: if it is a negative look-around, the transition signal is suppressed because the matching of the look-around fragment at that position indicates the assertion has been violated; or, if it is a positive look-around, the look-around event allows the transition to signal because the matching of the look-around fragment indicates the assertion has been satisfied. Importantly, for the case of positive look-around, the target NFA state must have been configured to automatically suppress the target transition unless it receives an assertion event at the same position.

In the example of "cat(?!=atonic).*dog", the DFA engine 110 matches each occurrence of 'atonic' in the input stream and signals a look-around event into the NFA with launch position just before the first symbol of "atonic" (where the 't' in 'cat' may be found). The target NFA state may be, for example, the state matching 't' in "cat", specifically targeting the 't' transition. If that state attempts to make the 't' transition at the input position where it receives this event, the 't' transition will be suppressed, because it is the first 't' in "catatonic". This requires the state matching 't' to be part of the NFA processing so that the full word "cat" cannot be a DFA entrance fragment. Also, the target NFA state may be the state matching ".*d" and targeting the in-transition to that state which will be suppressed if the state receives this event at the same position. In this case, "cat" can be the entrance fragment.

In some situations, it is possible to target look-around events at NFA transitions earlier or later than the actual insertion point of the look-around assertion. In the "catatonic" example above, the look-around event could be targeted at the 'a' transition in "cat". This is assuming it is part of NFA processing. The launch position of the look-around event will need to be computed as two symbols before the start of the "atonic" match. This is where the 'a' in "cat" could be found. An application of such an adjustment is to implement a complex NFA cell representing multiple sub-states and internal transitions, but to only make certain of the transitions available for look-around event targeting. Then, if an expression maps into such a complex state with a look-around inserted at an unsupported internal transition, the look-around event may be re-targeted at a supported transition with a launch position adjustment. Look-around events can be safely shifted around to process at positions other than the look-around insertion point but the decoupled DFA 110 and NFA 120 and the LPS 170 accomplish the process.

Support for high-branching NFA states may also be accomplished in a dynamically reconfigurable NFA cell array in an embodiment of the invention. If an NFA state has a large number of transitions to child states, such as 10 or 50, it presents a possibility of too many inactive states being preloaded in an NFA cell array architecture. Each NFA cell typically only supports one or a small number of out-transitions so that a high-branching state would need to be loaded into multiple cells. This can be very expensive in terms of logic and resource utilization. Typically, in a reconfigurable NFA cell array, a parent state needs to reference its next child states. The possibility of many references leads to a type of reference explosion, wherein the parent state may consume large numbers of NFA cells to accommodate all its child state references. An embodiment of the invention has a child state instead of the parent state performing the referencing function, so that the parent state can fit in one or a small number of NFA cells.

The DFA engine may be configured to match a fragment from the beginning of each branch of the high-branching state. This is not an entrance fragment. Rather, it is in the middle, or end, of the associated rule. When the DFA engine matches this fragment, known as a dynamic link fragment, it will send a dynamic link event into the NFA engine via the LPS. It will use the first symbol of the fragment as the launch position. The event will have an NFA state reference to a specialized "dynamic link" state representing matching of the same fragment within the NFA structure, which has an in-transition from the high-branching state and may have an out-transition to subsequent states. The dynamic link state is loaded into the cell array as other states are loaded into the cell array. When it loads, the cell array's state loading logic will establish a transition link form the high-branching parent state to the dynamic link child state. Since the high-branching parent state does not contain references to all of its child states, this will be accomplished by detecting the child state's reference to the parent state rather than by detecting a parent state's reference to a child state. The dynamic link event is programmed into the child state's launch timer which signals at the launch position. This is the position where the high-branching parent state should transition to the child state. If the parent state transitions to the child state at the same position as the dynamic link event signals, then the child state activates. The dynamic link event signal is required because the parent state may attempt to signal to the child state at positions other than where the dynamic link fragment matched. The dynamic link child state stands in for the dynamic link fragment that was matched but it does not need to actually re-match that fragment. So, it delays a number of symbol positions corresponding to the length of the fragment and then out-transitions to its next state.

Matching proceeds in the NFA engine through a high-branching parent state into one of its child states without explicit references to the many child states being present. For example, a parent state with 50 child states may transition to a dynamic link child state, with DFA assistance, with only the use of two NFA cells. If a few transitions of a high-branching NFA state do not lead to DFA-friendly fragments, those transitions can be left on the parent state as explicit child references. The other remaining DFA-friendly branches are linked dynamically.

As an example, the expression "subject:.*(cat|dog|fish-|hamster|lizard) food", perhaps written by a pet store owner to categorize email inquiries, can be used. The '.*' state has 5 out-transitions and could have many more for an alternative rule including more classifications. To apply dynamic link states, the DFA engine is configured to match "cat, "dog", "fish", "hamster", and "lizard". When the DFA engine matches "fish", for example, it sends a dynamic link event to the NFA, with a launch position at the T. The dynamic link child state for "fish" loads into the cell array and is connected to the '.*' if present. If the '.*' state is active at the position the dynamic link event signals in the child state, the child state will receive an in-transition from the parent state at the 'f' position, activate at the 'i' position, delay until the 'h' position, and out-transition to the next NFA state matching the space "before "food". It may be that all the dynamic child states have the same next state so a single dynamic child state could be loaded in response to any of the five fragment matches. This is so as long as the dynamic child state is designed to support a variable delay length before the out-transition since the fragments are of various lengths. Otherwise, the same child state could be used only for fragments of equal length ("cat" or "dog").

An HFA compiler will configure the DFA and NFA instructions with instructions appropriate to cooperate in matching a given ruleset. The compiler may be constructed as follows: An NFA compiler will be used to translate a set of regular expressions or similar rules into an NFA. Then an algorithm is applied to cut the NFA graph into DFA portions adjacent to the root state(s) and remaining NFA portions. One possible algorithm is to make the cut a fixed distance from the root state, such as 4 transitions away but cut closer to the root prior to any NFA state with an alternative—in-transition other than the path from the root, such as the self-transition in a '.*' state or prior to a transition with a symbol class wider than some threshold, such as 5 symbols. The DFA portion of the NFA graph is then transformed into an actual DFA by subset-construction algorithms. These treat each state with a cut-point transition as an accepting state which is used to generate an entrance event into the NFA state across the cut transition. Look-around assertions may be extracted from the rules during NFA compilation, with references to the assertions left annotated on NFA transitions and used to encode look-around behavior in the NFA instructions for associated states. The extracted look-around fragments are compiled into additional NFA graphs which are included whole in the subset construction into the DFA. High branching NFA states may be detected after cut points are selected with a sub-graph following each branch extracted and included in subset construction of the DFA, replaced in the NFA graph with placeholders for dynamic link states. These may be encoded appropriately in NFA instructions without explicit references encoded in their parent states.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A hybrid of a Non-deterministic Finite Automata (NFA) and a Deterministic Finite Automata (DFA) comprising:
a DFA engine that,
receives input symbols from an input stream to match predetermined rule fragments suitable for processing by the DFA engine, wherein the predetermined rule fragments comprise a filter fragment, and
signals a filter event, said filter event comprising one or more references to one or more specific NFA states in an NFA to be activated and one or more launch positions in said input stream, based on the matches of the predetermined rule fragments, and token outputs; and
an NFA engine that,
receives the filter event from the DFA engine,
activates a non-permanent keep-alive spinner start state in the NFA at the received one or more launch positions,
matches corresponding tail portions, and
signals output tokens,
wherein the DFA engine and the NFA engine are configured to process the input stream simultaneously, wherein each launch position comprises a specified position of the input stream different from a present position of the input stream at the NFA engine, wherein the DFA engine is a first hardware engine, and wherein the NFA engine is a second hardware engine.

2. The hybrid of claim 1, wherein the NFA engine is a dynamically configurable cell array.

3. The hybrid of claim 1, further comprising:
a launch position sorter that receives entrance events from the DFA engine and sorts the entrance events into launch positions, wherein the NFA engine receives the entrance events from the launch position sorter; and
at least one instruction cache is accessible by the DFA engine and the NFA engine;
wherein the at least one instruction cache is connected to an instruction memory interface for accessing instructions from an external memory.

4. The hybrid of claim 3, wherein said DFA engine is a multi-threaded hardware DFA engine.

5. The hybrid of claim 3, wherein said NFA engine is a dynamically configurable NFA cell array.

6. The hybrid of claim 3, wherein said NFA engine is a dynamically configurable NFA cell array and said DFA engine is a multi-threaded hardware DFA engine.

7. The hybrid of claim 1, wherein:
at least one of said predetermined rule fragments is a look-around fragment.

8. The hybrid of claim 7, wherein a match of the look around fragment causes a look around event to be signaled to the NFA engine, and wherein the NFA engine reacts to the signal, said reaction being a response by the NFA engine to block a transition in a corresponding NFA state if a corresponding look around assertion is negative and to allow a transition in a corresponding NFA state if the look around assertion is positive.

9. The hybrid of claim 8, wherein the NFA engine is a dynamically configurable cell array.

10. The hybrid of claim 1, wherein:
said NFA engine is a dynamically configurable NFA cell array; and
at least one of said predetermined rule fragment is a fragment which follows a high-branching state in the NFA.

11. The hybrid of claim 10, wherein a match of the fragment following a high-branching state causes a dynamic link event to be signaled to the NFA engine, and wherein the NFA engine reacts to the signal, said reaction being a response by the NFA engine to activate a corresponding child state and dynamically linking said child state to a corresponding parent state.

12. The hybrid of claim 11, wherein:
said child state comprises a reference to the corresponding parent state; and
the NFA engine enables a transition from the parent state to the child state at a launch position signaled from the DFA engine.

13. A method of matching a rule to symbols from an input stream, said method comprising:
matching symbols from the input stream to at least one fragment of the rule in a Deterministic Finite Automata (DFA) engine, wherein the at least one fragment comprises a filter fragment;
signaling a Non-deterministic Finite Automata (NFA) engine with a filter event, said filter event comprising one or more launch positions, based on the matching of the filter fragment;
activating a non-permanent keep-alive spinner start state in the NFA at the one or more launch positions;
matching symbols from the input stream to a corresponding other portion of the rule in the NFA engine; and
outputting a match token, wherein the DFA engine and the NFA engine are configured to process the input stream simultaneously, wherein each launch position comprises a specified position of the input stream different from a present position of the input stream at the NFA engine.

14. The method of claim 13, wherein said at least one fragment is an entrance fragment.

15. The method of claim 13, wherein said at least one fragment is a look-around fragment.

16. The method of claim 15, said method further comprising:
    signaling the NFA engine with look-around events;
    if the look-around event results from a negative look-around assertion, blocking a transition in a corresponding NFA state; and
    if the look-around event results from a positive look-around assertion, allowing a transition in a corresponding NFA state.

17. The method of claim 13, wherein said at least one fragment is a dynamic-link fragment.

18. The method of claim 17, wherein said NFA engine is a dynamically reconfigurable NFA cell array, said method further comprising:
    signaling the NFA engine with a dynamic-link event, said dynamic-link comprising a launch position;
    activating a corresponding child state, said child state comprising a reference to a corresponding parent state, and dynamically linking said child state to the corresponding parent state; and
    enabling a transition from the corresponding parent state to the child state at the launch position.

19. The method of claim 13, said method further comprising:
    after matching a fragment in the DFA engine, signaling a match event, said event comprising a launch position, to the NFA engine; and
    activating an NFA state at said launch position.

20. A method of matching, within a hybrid engine, symbols in an input stream to a rule, said hybrid engine comprising a DFA engine and an NFA engine, said method comprising:
    compiling the rule with a hybrid compiler into a set of instructions for use within the hybrid engine wherein the compiler apportions into at least one fragment, said at least one fragment being suited to processing in a DFA engine, wherein the at least one fragment comprises a filter fragment;
    assigning at least one of the fragments suited to DFA processing including the filter fragment to the DFA engine;
    assigning at least a portion of the rule to the NFA engine;
    matching the filter fragment assigned to the DFA engine to symbols from the input stream;
    signaling a filter event to the NFA engine, said filter event comprising one or more references to one or more specific NFA states in an NFA to be activated and one or more launch positions in said input stream;
    activating a non-permanent keep-alive spinner start state in the NFA at the indicated launch position;
    matching at least one portion of the rule in the NFA engine with symbols from the input stream in the NFA engine; and
    outputting tokens based on successful matches,
    wherein the DFA engine and the NFA engine are configured to process the input stream simultaneously, wherein each launch position comprises a specified position of the input stream different from a present position of the input stream at the NFA engine.

* * * * *